(12) United States Patent
Padula

(10) Patent No.: US 8,917,170 B2
(45) Date of Patent: Dec. 23, 2014

(54) APPARATUS FOR MEASURING ARTICULATION ANGLE BETWEEN A TRACTOR AND TRAILER IN AN ARTICULATED VEHICLE

(71) Applicant: Santo A. Padula, Medina, OH (US)

(72) Inventor: Santo A. Padula, Medina, OH (US)

( * ) Notice: Subject to any disclaimer, the term of this patent is extended or adjusted under 35 U.S.C. 154(b) by 253 days.

(21) Appl. No.: 13/644,321

(22) Filed: Oct. 4, 2012

(65) Prior Publication Data

US 2013/0082453 A1   Apr. 4, 2013

Related U.S. Application Data

(60) Provisional application No. 61/542,957, filed on Oct. 4, 2011.

(51) Int. Cl.
*B62D 13/00* (2006.01)
*B62D 53/08* (2006.01)

(52) U.S. Cl.
CPC .................................... *B62D 53/08* (2013.01)
USPC ........ 340/431; 340/425.5; 280/426; 280/432; 280/433; 280/442

(58) Field of Classification Search
CPC ...... B62D 13/00; B62D 13/02; B62D 13/025; B62D 15/02; B62D 15/021; B62D 15/023
USPC ........ 340/425.5, 431; 280/426, 432, 433, 442
See application file for complete search history.

(56) References Cited

U.S. PATENT DOCUMENTS

| 5,152,544 | A  | * | 10/1992 | Dierker et al. | 280/432 |
| 5,536,030 | A  |   | 7/1996  | Bettini |  |
| 7,793,965 | B2 |   | 9/2010  | Padula |  |
| 2002/0070520 | A1 | * | 6/2002 | Osborn et al. | 280/93.512 |
| 2006/0071448 | A1 | * | 4/2006 | Craig et al. | 280/511 |
| 2006/0145450 | A1 | * | 7/2006 | Metternich et al. | 280/433 |
| 2007/0216134 | A1 | * | 9/2007 | Padula | 280/443 |

\* cited by examiner

*Primary Examiner* — Andrew Bee
(74) *Attorney, Agent, or Firm* — Renner Kenner Greive Bobak Taylor & Weber

(57) ABSTRACT

Apparatus for measuring the articulation angle between a tractor and trailer connected by a kingpin and fifth wheel include a transfer assembly associated with the kingpin and interacting with the fifth wheel such that the transfer assembly is rotationally moved relative to the kingpin by relative rotational movement between the kingpin and the fifth wheel. This rotational movement is read by an articulation sensing mechanism having one of a reader element and output element mounted to the transfer assembly and the other of the reader element and the output element operatively mounted to the trailer such that the reader element and the output element interact to provide a signal corresponding to the articulation angle between the tractor and trailer. This signal can be analyzed by a processor for any beneficial use, for example, outputting to a counter steering mechanism.

23 Claims, 9 Drawing Sheets

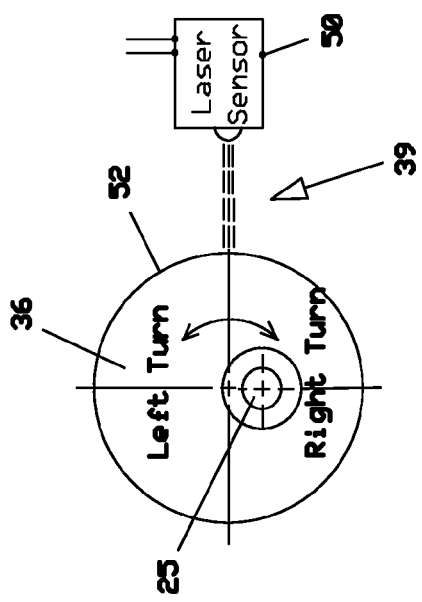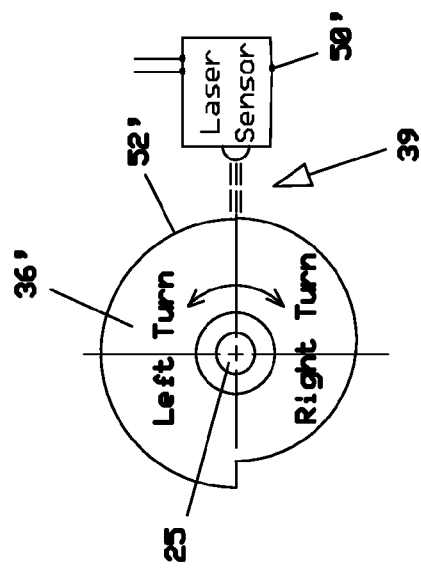
Figure 2
Figure 3

APPARATUS FOR MEASURING ARTICULATION ANGLE BETWEEN A TRACTOR AND TRAILER IN AN ARTICULATED VEHICLE

CROSS-REFERENCE TO RELATED APPLICATIONS

This application claims the benefit of U.S. Provisional Application No. 61/542,957, filed Oct. 4, 2011.

FIELD OF THE INVENTION

The present invention generally relates to articulated vehicles. More particularly, the present invention relates to apparatus for measuring the angle of articulation in an articulated vehicle during a turn.

BACKGROUND OF THE INVENTION

Articulated vehicles are well-known, and generally include a tractor and a trailer, the trailer being secured to the tractor such that the two may pivot relative to one another about the point of connection. The tractor provides the means for driving the tractor and trailer combination, and is typically the steering means for the combination. In a 'double combination' vehicle, a second trailer is typically towed by a dolly attached to the back of the first trailer and is the steering means for the second trailer such that the two may pivot relative to one another about the point of connection. However, the prior art does provide for trailers that provide a counter-steering function.

For example, in U.S. Pat. No. 7,793,965, apparatus and methods are provided for measuring the angle of articulation between a tractor and trailer so that the wheels of the trailer can be counter-steered to better track the movement of the tractor. The counter-steering of the trailer wheels is dependent upon an articulation angle measurement, and the present invention serves to provide improvements in apparatus designed to measure such an angle of articulation.

SUMMARY OF THE INVENTION

In a first embodiment, this invention provides an apparatus for measuring the articulation angle between a tractor and trailer in an articulated vehicle during turning of the tractor, the tractor including a fifth wheel mounted to the tractor and having a mounting zone defined in part by opposed parallel walls of fixed width there between, the apparatus comprising: a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom; a transfer assembly mounted to said kingpin and having a tongue positioned between the opposed parallel walls of the mounting zone, said tongue having a width fitting intimately between the fixed width between the opposed parallel walls of the fifth wheel, said transfer assembly being rotationally moved relative to said kingpin by relative rotational movement between said kingpin and the fifth wheel; an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

In a second embodiment, this invention provides an apparatus as in the first embodiment above, wherein the fifth wheel includes opposed angled walls feeding into said opposed parallel walls of said mounting zone.

In a third embodiment, this invention provides an apparatus as in any embodiment above, wherein said kingpin is devoid of a through bore receiving a portion of said transfer assembly.

In a fourth embodiment, this invention provides an apparatus as in any embodiments above, further comprising means for transmitting the signal corresponding to the articulation angle to a processor for calculating the articulation angle based on the signal.

In a fifth embodiment, this invention provides an apparatus as in any embodiments above, wherein said output element is mounted to said transfer assembly and said reader element is mounted to said kingpin.

In a sixth embodiment, this invention provides an apparatus as in any embodiments above, wherein said reader element is a laser distance sensor directing a laser beam at said output element such that the distance the laser beam travels to contact the output element varies with the articulation angle between the tractor and trailer.

In a seventh embodiment, this invention provides an apparatus as in any embodiments above, wherein said output element is a sleeve mounted around said kingpin, said sleeve presenting a sloped surface to said laser beam.

In a eighth embodiment, this invention provides an apparatus as in any embodiments above, wherein said sleeve rotates on a bearing about said kingpin.

In a ninth embodiment, this invention provides an apparatus as in any embodiments above, wherein the apparatus further comprises a seal between said sleeve and said kingpin mounting plate, said sloped surface of said sleeve being presented interiorly of said seal:

In a tenth embodiment, this invention provides an apparatus as in any embodiments above, wherein said laser distance sensor is mounted above said kingpin mounting plate and directs said laser beam through a bore through said kingpin mounting plate.

In a eleventh embodiment, this invention provides an apparatus as in any embodiments above, wherein said kingpin shaft includes a through bore at its central axis, said through bore also extending through said kingpin mounting plate, and said transfer assembly includes a rod extending through said through bore to associate said tongue with said output element.

In a twelfth embodiment, this invention provides an apparatus as in any embodiments above, wherein said output element is located above said kingpin mounting plate and said laser distance sensor is mounted above said kingpin mounting plate.

In a thirteenth embodiment, this invention provides an apparatus as in any embodiments above, wherein said output element is a magnet and said reader element is a magneto resistive element that is influenced by said magnet to output a signal based upon the positioning of said magnet along the length of said magneto resistive element.

In a fourteenth embodiment, this invention provides an apparatus as in any embodiments above, further comprising a stationary sleeve portion about said kingpin, said stationary sleeve portion providing an annular channel and holding said magneto resistive element.

In a fifteenth embodiment, this invention provides an apparatus as in any embodiments above, wherein said transfer assembly includes a magnet support mounted so as to rotate in said annular channel, said magnet support holding said magnet and being operatively connected to said tongue.

In a sixteenth embodiment, this invention provides an apparatus as in any embodiments above, wherein said kingpin shaft has a distal end opposite said kingpin mounting plate and said transfer assembly is mounted to said distal end of said kingpin shaft.

In a seventeenth embodiment, this invention provides an apparatus as in any embodiments above, wherein said reader element is mounted to said transfer assembly.

In a eighteenth embodiment, this invention provides an apparatus as in any embodiments above, wherein said reader element is mounted on a step portion of said transfer assembly and said output element is mounted around at least a portion of said kingpin.

In a nineteenth embodiment, this invention provides an apparatus as in any of embodiments above, wherein said reader element is a Hall Effect sensor and said output element is a magnet.

In a twentieth embodiment, this invention provides an apparatus as in any above, wherein said transfer assembly is mounted to said distal end of said kingpin shaft by a connector, and said output element is mounted around at least a portion of said connector.

In a twenty-first embodiment, this invention provides an apparatus as in any embodiments above, wherein said reader element is a Hall Effect sensor and said output element is a magnet.

In a twenty-second embodiment, this invention provides an apparatus for measuring the articulation angle between a tractor and trailer in an articulated vehicle during turning of the tractor, the tractor including a fifth wheel mounted to the tractor and having a mounting zone, the apparatus comprising: a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom; a transfer assembly mounted around said kingpin and having a tongue positioned in the mounting zone, said transfer assembly being rotationally moved relative to said kingpin by relative rotational movement between said kingpin and the fifth wheel; an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

In a twenty-third embodiment, this invention provides an apparatus as in the twenty-second embodiment above, wherein said reader element is a laser distance sensor directing a laser beam at said output element such that the distance the laser beam travels to contact the output element varies with the articulation angle between the tractor and trailer.

In a twenty-fourth embodiment, this invention provides an apparatus as in either the twenty-second or twenty-third embodiments above, wherein said output element is a sleeve mounted around said kingpin, said sleeve presenting a sloped surface to said laser beam.

In a twenty-fifth embodiment, this invention provides an apparatus as in any of the twenty-second through twenty-fourth embodiments above, wherein said sleeve rotates on a bearing about said kingpin.

In a twenty-sixth embodiment, this invention provides an apparatus as in any of the twenty-second through twenty-fifth embodiments above, wherein the apparatus further comprises a seal between said sleeve and said kingpin mounting plate, said sloped surface of said sleeve being presented interiorly of said seal.

In a twenty-seventh embodiment, this invention provides an apparatus as in any of the twenty-second through twenty-sixth embodiments above, wherein said laser distance sensor is mounted above said kingpin mounting plate and directs said laser beam through a bore through said kingpin mounting plate.

In a twenty-eighth embodiment, this invention provides an apparatus as in any of the twenty-second through twenty-seventh embodiments above, wherein said output element is a magnet and said reader element is a magneto resistive element that is influenced by said magnet to output a signal based upon the positioning of said magnet along the length of said magneto resistive element.

In a twenty-ninth embodiment, this invention provides an apparatus as in any of the twenty-second through twenty-eighth embodiments above, further comprising a stationary sleeve portion about said kingpin, said stationary sleeve portion providing an annular channel and holding said magneto resistive element.

In a thirtieth embodiment, this invention provides an apparatus as in any of the twenty-second through twenty-ninth embodiments above, wherein said transfer assembly includes a magnet support mounted so as to rotate in said annular channel, said magnet support holding said magnet and being operatively connected to said tongue.

In a thirty-first embodiment, this invention provides an apparatus for measuring the articulation angle between a tractor and trailer in an articulated vehicle during turning of the tractor, the tractor including a fifth wheel mounted to the tractor and having a mounting zone, the apparatus comprising: a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom to provide a distal end; a transfer assembly mounted at said distal end of said kingpin and having a tongue positioned in the mounting zone, said transfer assembly being rotationally moved relative to said kingpin by relative rotational movement between said kingpin and the fifth wheel; an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

In a thirty-second embodiment, this invention provides an apparatus as in the thirty-first embodiment above, wherein said transfer assembly is mounted at a blind bore extending into said distal end of said kingpin.

In a thirty-third embodiment, this invention provides an apparatus as in either the thirty-first or the thirty-second embodiments above, wherein said reader element is mounted to said transfer assembly.

In a thirty-fourth embodiment, this invention provides an apparatus as in any of the thirty-first through thirty-third embodiments above, wherein said reader element is mounted on a step portion of said transfer assembly and said output element is mounted around at least a portion of said kingpin.

In a thirty-fifth embodiment, this invention provides an apparatus as in any of the thirty-first through thirty-fourth embodiments above, wherein said reader element is a Hall Effect sensor and said output element is a magnet.

In a thirty-sixth embodiment, this invention provides an apparatus as in any of the thirty-first through thirty-fifth embodiments above, wherein said transfer assembly is mounted to said distal end of said kingpin shaft by a connector, and said output element is mounted around at least a portion of said connector.

In a thirty-seventh embodiment, this invention provides an apparatus as in any of the thirty-first through thirty-sixth embodiments above, wherein said reader element is a Hall Effect sensor and said output element is a magnet.

BRIEF DESCRIPTION OF THE DRAWINGS

FIGS. 2 and 3 shown general concepts for embodiments of discs to be employed with laser distance sensors in certain embodiments of the apparatus of this invention;

DETAILED DESCRIPTION OF ILLUSTRATIVE EMBODIMENTS

The major elements of the apparatus disclosed herein for measuring the angle of articulation in an articulated vehicle are beneficially associated only with the trailer portion, though portions of the apparatus do interact with the fifth wheel carried by the tractor. By associating the major elements of the apparatus with the trailer and its kingpin, it is possible to continue to employ prior art tractors and fifth wheels, without adaptation, and yet still practice and enjoy the benefits of the present invention by adapting only the trailer. Particularly, the present invention is implemented by altering the interaction between a trailer kingpin and the tractor fifth wheel. In certain embodiments, wherein the kingpin is a replaceable kingpin that can be removed and replaced on a trailer, it is possible to provide the present apparatus as part of a newly manufactured kingpin assembly. In embodiments wherein a kingpin is welded to the trailer, it is possible to retroactively fit apparatus of the present invention to the kingpin.

Figure 1:
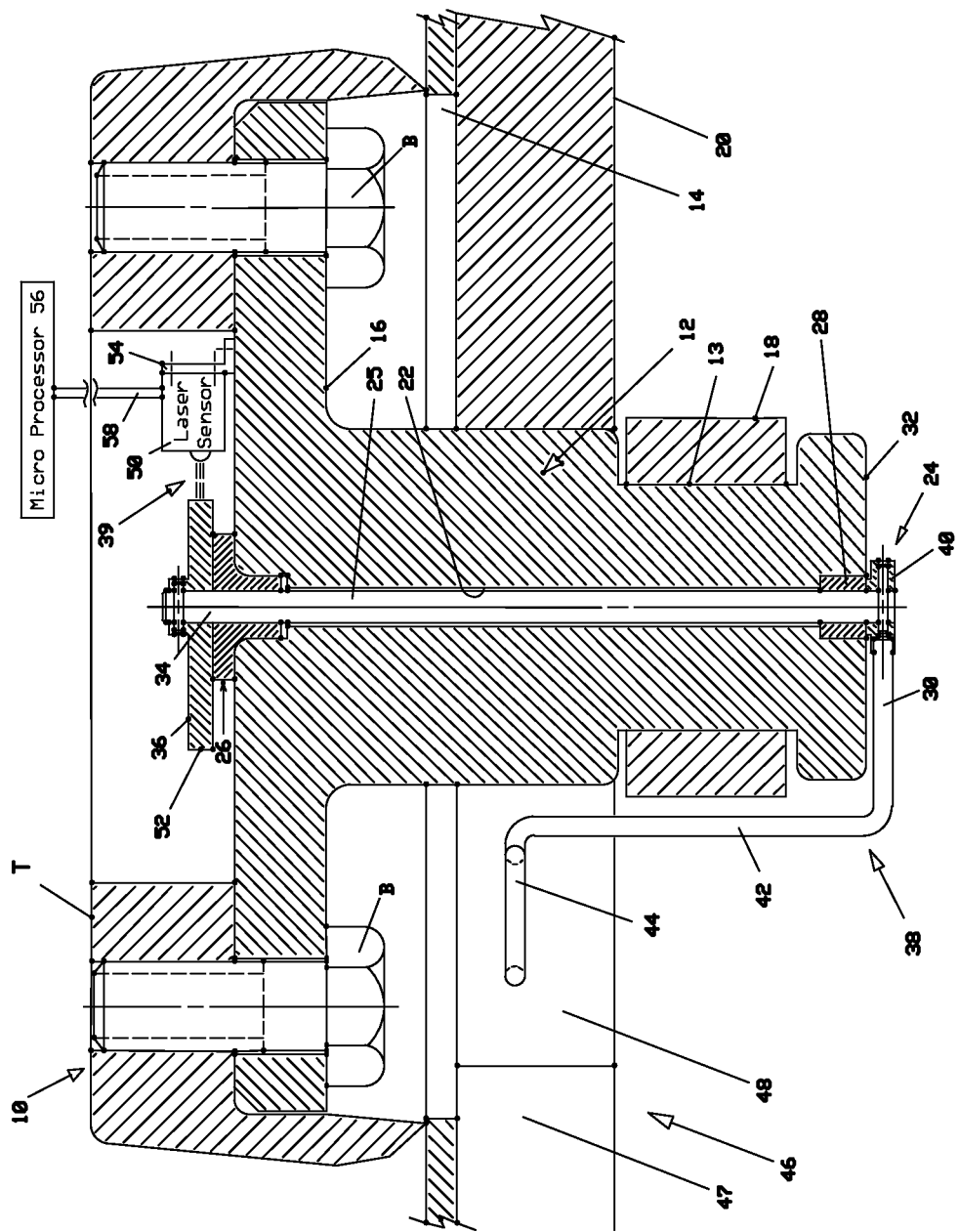
FIG. 1 is a cross sectional view of an embodiment of an apparatus in accordance with this invention, the cross section taken through the mouth of a fifth wheel and showing the interaction of the kingpin, the fifth wheel and the apparatus of this embodiment.
Figure 9:
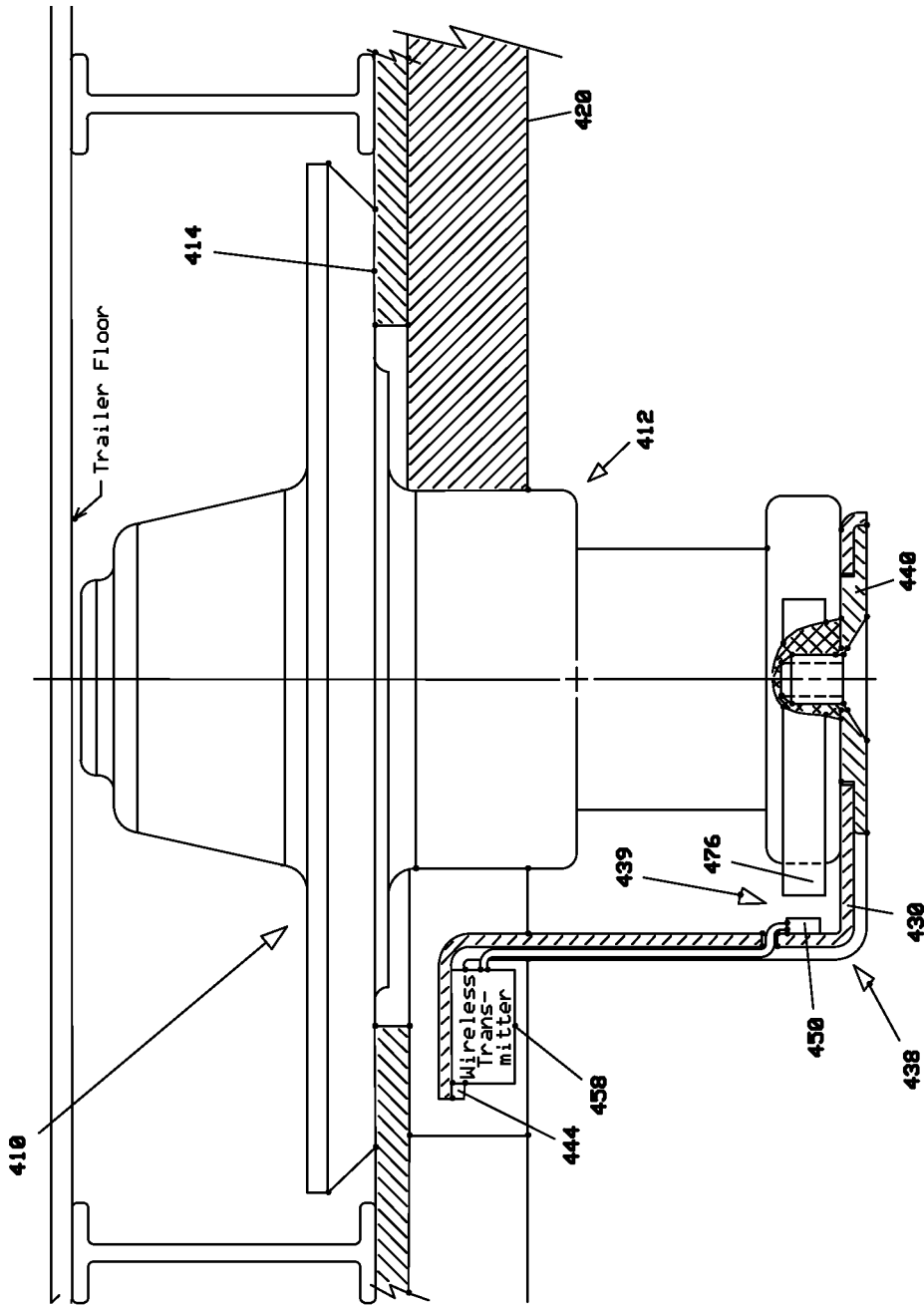
FIG. 9 is a cross sectional view of an embodiment of this invention similar to that of FIG. 8, but shown with a kingpin welded to the trailer instead of being mounted by bolts.
Figure 10:
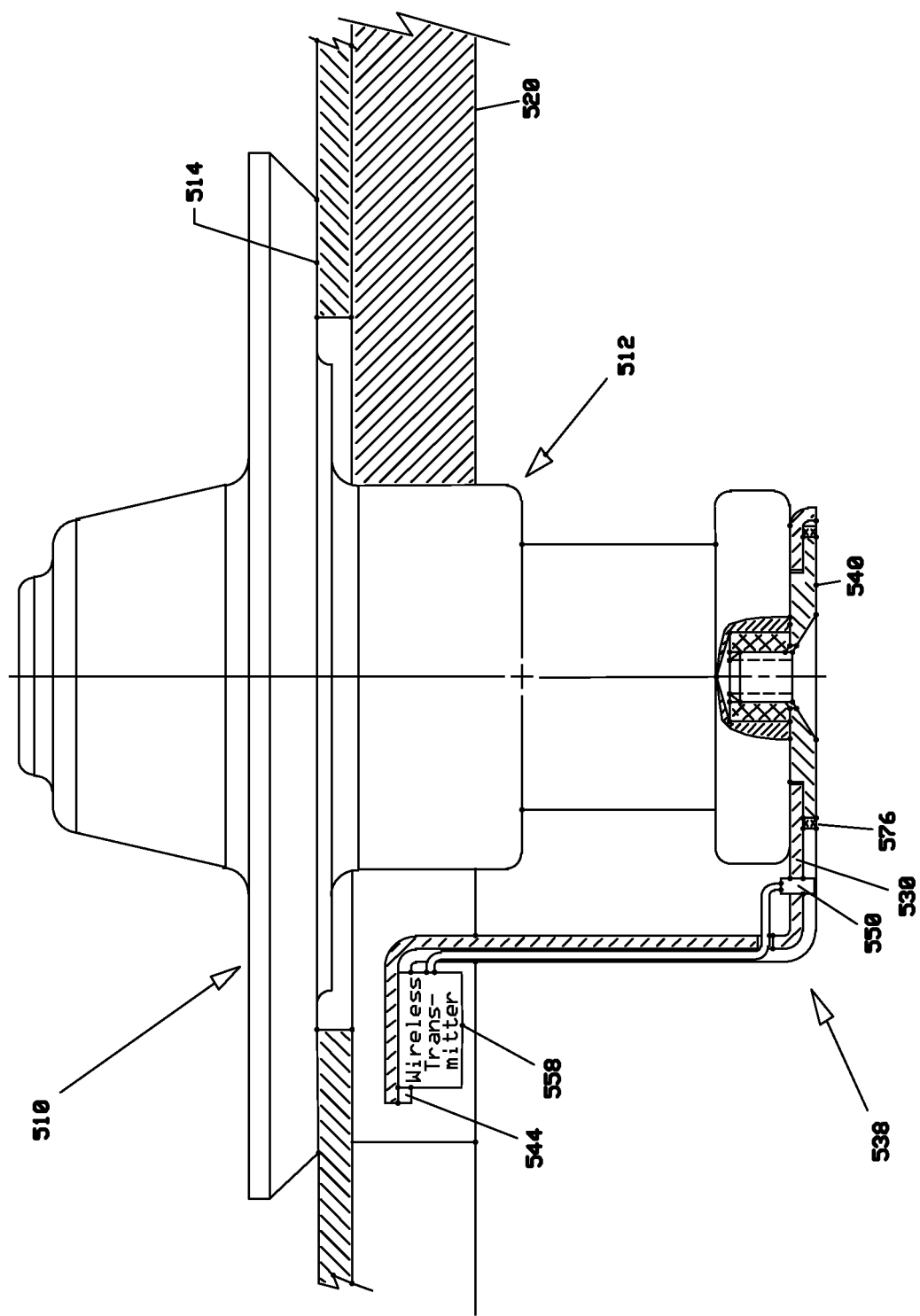
FIG. 10 is a cross sectional view of an embodiment of this invention similar to that of FIGS. 8 and 9 but with an alternative placement of sensor and magnet elements.

Turning now to FIG. 1, a first apparatus in accordance with this invention is shown and designated by the numeral 10. Apparatus 10 includes a kingpin 12 that is mounted to a kingpin housing T welded to a trailer, at the skid plate 14, by a kingpin mounting plate 16 and bolts B. It will be appreciated that this general structure reflects a common manner in which a kingpin is mounted to a trailer. Sometimes this structure is provided by being retrofit to a trailer after removing another common kingpin assembly that is welded to a trailer. Such a welded kingpin structure is shown in FIGS. 9 and 10 herein, and it can be seen that the welded kingpin (e.g., FIG. 9, kingpin 412) can be cut out and replaced with the structure comprising the housing T, a new kingpin (e.g., kingpin 12) and bolts (or other suitable structures) securing the kingpin to the housing T. Thus, it will be appreciated that the apparatus herein can in some embodiments, be retrofit to existing trailers. In this embodiment, the kingpin 12 includes a mounting section 13 of smaller diameter than the portion above and below so as to create a channel engaged by a clamp 18 of a fifth wheel 20. As known, when the trailer is mounted to a tractor at the fifth wheel, the fifth wheel and the skid plate are in intimate contact with each other, with the trailer's weight imparted to the fifth wheel of the tractor.

Figure 4:
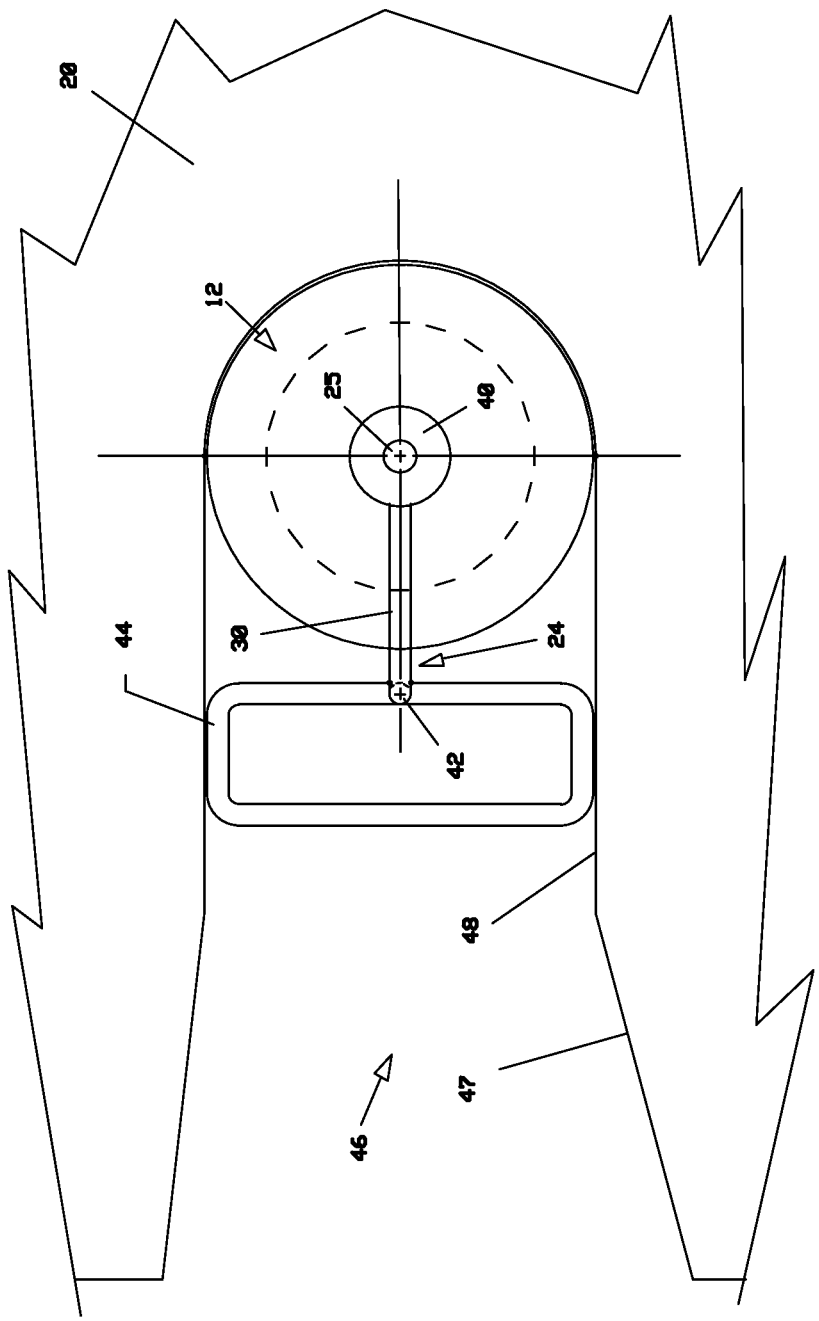
FIG. 4 is a bottom plan view of relevant portions of the apparatus of FIG. 1, showing the interaction of a tongue of a transfer assembly with the mouth of a fifth wheel, this figure being also generally relatable to all other embodiments.

The kingpin 12 in this embodiment has a through bore 22 drilled therethrough to receive a transfer assembly 24. More particularly, the transfer assembly 24 includes a rod 25 that may freely rotate in the through bore 22 on upper and lower bearings 26 and 28 (or other suitable type of bushing/bearing). The rod 25 extends all the way through the through bore 22, to provide a leg 30 extending radially outward below the base 32 (or distal end) of the kingpin 12. At the portion 34 of the rod 25 that extends through the mounting plate 16 and above the top surface thereof, a disc 36 is secured or formed to the rod 25 so as to rotate therewith. This disc 36 forms a part of an articulation sensing means 39, particularly an output element thereof. The upper bearing 26 is provided between the disc 36 and the top surface of the kingpin mounting plate 16. The disc 36 can be a circular disc that is mounted off-center to the rod 25, as shown in FIG. 2. Alternatively, disc 36 may be a variable-radius disc, as, for example, like the shell-shaped disc 36', as shown in FIG. 3. A step assembly 38 is secured to (as by connection 40) or formed as part of rod 25. The step assembly 38 includes the leg 30, which extends to a step 42 that terminates at a radially-extending tongue 44. The tongue 44 is positioned relative to the remainder of the kingpin 12 so as to engage the parallel walls of the mounting zone 46 of the fifth wheel 20. This is particularly appreciable from a review of FIG. 4, wherein the mounting zone 46 is shown with opposed angled walls 47 that extend to opposed parallel walls 48 with the tongue 44 intimately engaging the opposed parallel walls 48, when the kingpin 12 is mounted in the mounting zone in the normal manner. It is well-known that such a fifth wheel 20 will pivot about the kingpin 12 as the tractor is steered and thus moves relative to the trailer to which the kingpin 12 is secured. Thus, it will be appreciated that, during a turn, the opposed parallel walls 48 of the fifth wheel 20 will act upon the tongue 44 of the step assembly such that the rod 25, and, more particularly, the disc 36 associated therewith will rotate on the bearings 26, 28 relative to the kingpin 12.

A laser distance sensor 50 is secured to the trailer so as to point at the circumference 52 of the disc 36. The laser distance sensor 50 forms the other part of the articulation sensing means 39, particularly a reader element thereof, "reading" the position of the output element (e.g., disc 36). In particular embodiments, the laser distance sensor 50 is secured to the kingpin mounting plate 16 (as by the bracket 54) so as to be part of a replaceable kingpin unit/assembly in accordance with this invention. Given that the disc 36 presents either a variable radius (as at circumference 52') or a consistent radius mounted off-center on the rod 25 (as at circumference 52), it will be appreciated that, as the tractor turns, the distance between the laser distance sensor 50 and the sidewall defining the circumference of the disc 36 (or 36') will change. As the tractor turns to the left, the distance between the laser distance sensor and the circumference of the disc (52 or 52') will be increased and a signal of increasing magnitude will be transmitted to the system. As the tractor turns to the right, the distance between the laser distance sensor and the circumference of the disc (52 or 52') will be reduced and a signal of decreasing magnitude will be transmitted to the system. Of course, this relation could be reversed, with distance increasing upon a right hand turn and decreasing upon a left hand turn. In particular embodiments, there is a singular relationship between the articulation angle and the signal generated by the reader element, i.e., the signal is unique to a given angle. In this way, no ambiguity exists, and the system would be accurate in determining an articulation angle even upon the loss and re-gaining of power to the system. The distance between the laser distance sensor and the circumference will relate to a specific angle of articulation between the tractor and trailer. Thus, this apparatus provides a particular apparatus for measuring the angle of articulation between a tractor and trailer. The angle so measured may be employed in various counter-steering systems or for any other purpose deemed beneficial.

Figure 5:
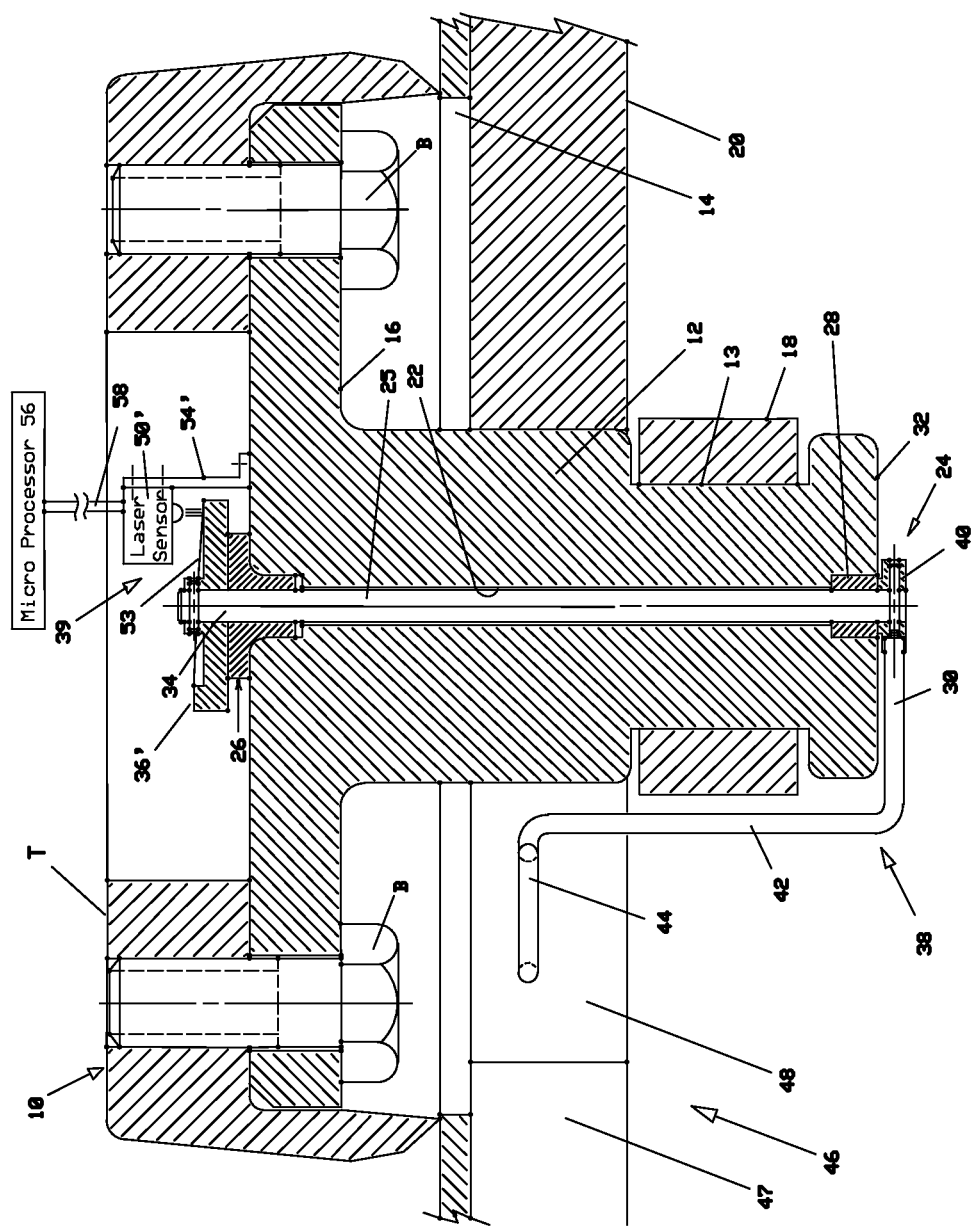
FIG. 5 is a cross sectional view of an embodiment of this invention similar to that of FIG. 1, but with a different type of disc for use with the laser distance sensor.

Although a particular configuration shown in FIG. 1 shows a laser distance sensor 50 pointed at the circumference of a disc 36, it should be appreciated that the disc 36 could instead have a varying thickness (in the vertical direction in the orientation of FIG. 1) and a laser distance sensor 50' could instead be mounted to the trailer to point down on the top surface 53 of the disc that provides the variable thickness (see FIG. 5). As the tractor turns to the left, the distance between the laser distance sensor and the varying vertical thickness disc will be increased and a signal of increasing magnitude will be transmitted to the system. As the tractor turns to the right, the distance between the laser distance sensor and the varying vertical thickness disc will be reduced and a signal of decreasing magnitude will be transmitted to the system. Again, in particular embodiments, the laser distance sensor 50' is secured to the kingpin mounting plate 16 (as by the bracket 54') so as to be part of a replaceable kingpin unit/assembly in accordance with this invention. Notably, the sensors 50 and 50' would be wired to an appropriate microprocessor or other processing unit 56 as, for example, through a wire 58 or 58', the processor serving to calculate the angle of articulation based on the relationship between the sensor element and the disc. Wireless communication could also be employed, as particularly noted with respect to other embodiments herein. In embodiments wherein the angle of articulation is employed for the purpose of calculating a counter-steer for the trailer, the processor could also serve to calculate a desired counter-steering angle for a counter-steering system. Notably, the data derived in accordance with this invention relating to an angle of articulation may be employed in any desired manner in which a tractor to trailer angle value measurement is needed.

The embodiments of FIGS. 1 and 5 are somewhat compromised by the fact that the kingpin 12 has a through bore 22 drilled therethrough. In the tractor/trailer industry, this may be determined to be structurally unsound for the loads that might be encountered, so the present invention also envisions embodiments that do not employ such through bores.

Figure 6:
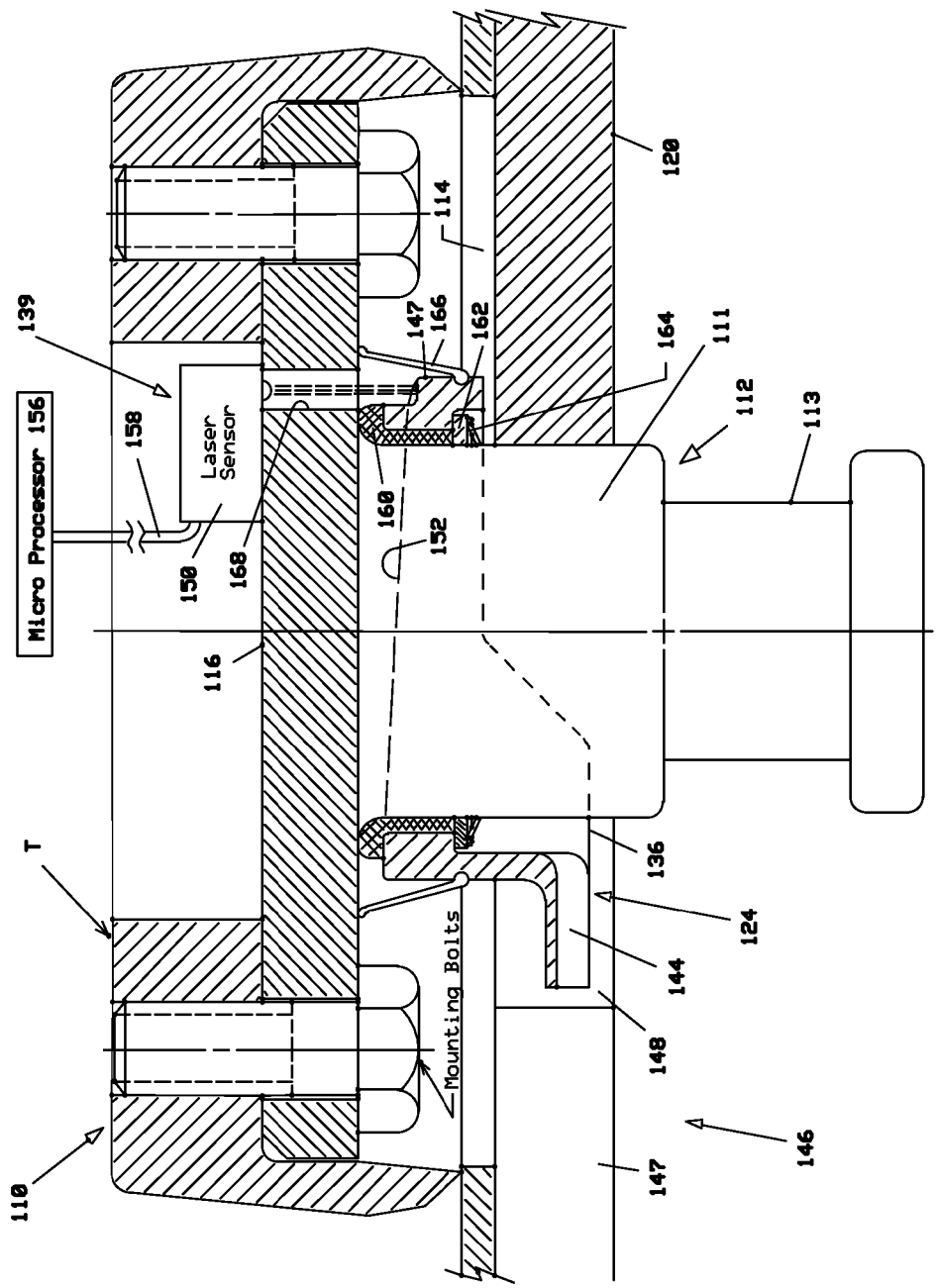
FIG. 6 is a cross sectional view of a second embodiment of this invention.

Turning now to FIG. 6, a second apparatus in accordance with this invention is shown and designated by the numeral 110. Apparatus 110 includes a kingpin 112 that, unlike kingpin 12 of the first apparatus 10, does not have a through bore drilled therethrough. Rather, kingpin 112 is simply a standard kingpin 112 that is mounted at the kingpin mounting plate 116 to a kingpin housing T welded to a trailer at the skid plate 114, and a transfer assembly 124 is provided around the kingpin, as opposed to running through the kingpin as in previous embodiments. A tongue 144 extends from an annular sleeve (or ring) 136 that presents a sloped top surface 152. This sleeve 136 and its sloped top surface 152 form a part of an articulation sensing means 139, particularly an output element thereof. As with the tongue 44, the tongue 144 is positioned relative to the remainder of the kingpin 112 so as to engage the opposed parallel walls 148 of the mounting zone of a fifth wheel 120, as already taught and described with respect to the engagement of the tongue 44 with the opposed parallel walls 48 of the fifth wheel 20 of FIG. 4. It will be appreciated that the engaging of the tongue 144 with the parallel sides of the fifth wheel will be substantially similar in this embodiment. The annular sleeve 136 is mounted about the upper portion 111 of the kingpin 112, about a bearing 160, and is held there by an annular support plate 162 and a retaining ring 164 so that it will rotate about the kingpin 112 as the tractor is steered and moves relative to the trailer to which the kingpin 112 is secured. Thus, it will be appreciated that, during a turn, the parallel sides of the mouth of the fifth wheel will act upon the tongue 144 of the annular sleeve 136 such that the annular sleeve 136, and, more particularly, the sloped top surface 152 thereof will rotate about the kingpin 112.

A seal 166 extends between the circumference 147 of the sleeve 136 and the underside of the kingpin mounting plate 116. This seal 166 protects the sloped top surface 152 of the annular sleeve 136. A laser distance sensor 150 is directed at the sloped top surface 152, through a through bore 168 in the kingpin mounting plate 116. The laser distance sensor 150 forms the other part of the articulation sensing means 139, particularly a reader element thereof, "reading" the position of the output element (e.g., sleeve 136). In particular embodiments, the laser distance sensor 150 is secured to the kingpin mounting plate 116 so as to be part of a replaceable kingpin unit/assembly in accordance with this invention. It would be appreciated that, in light of the sloped top surface 152 of the annular sleeve 136, as the tractor turns, the distance between the laser distance sensor 150 and the sloped top surface 152 will change. As the tractor turns to the left, the distance between the laser distance sensor and the sloped top surface 152 will be increased and a signal of increasing magnitude will be transmitted to the system. As the tractor turns to the right, the distance between the laser distance sensor and the sloped top surface 152 will be reduced and a signal of decreasing magnitude will be transmitted to the system. Of course, this relation could be reversed, with distance increasing upon a right hand turn and decreasing upon a left hand turn. The distance can be output to a micro processor 156 for calculating the angle of articulation. In particular embodiments, there is a singular relationship between the articulation angle and the signal generated by the reader element, i.e., the signal is unique to a given angle. In this way, no ambiguity exists, and the system would be accurate in determining an articulation angle even upon the loss and re-gaining of power to the system. The distance between the laser distance sensor 150 and the sloped top surface 152 will relate to a specific angle of articulation between the tractor and trailer. Thus, this apparatus provides a particular apparatus for measuring the angle of articulation between a tractor and trailer. The angle so measured may be employed in various counter-steering systems or for any other purpose deemed beneficial and in any manner in which a tractor to trailer angle value measurement is needed.

Figure 7:
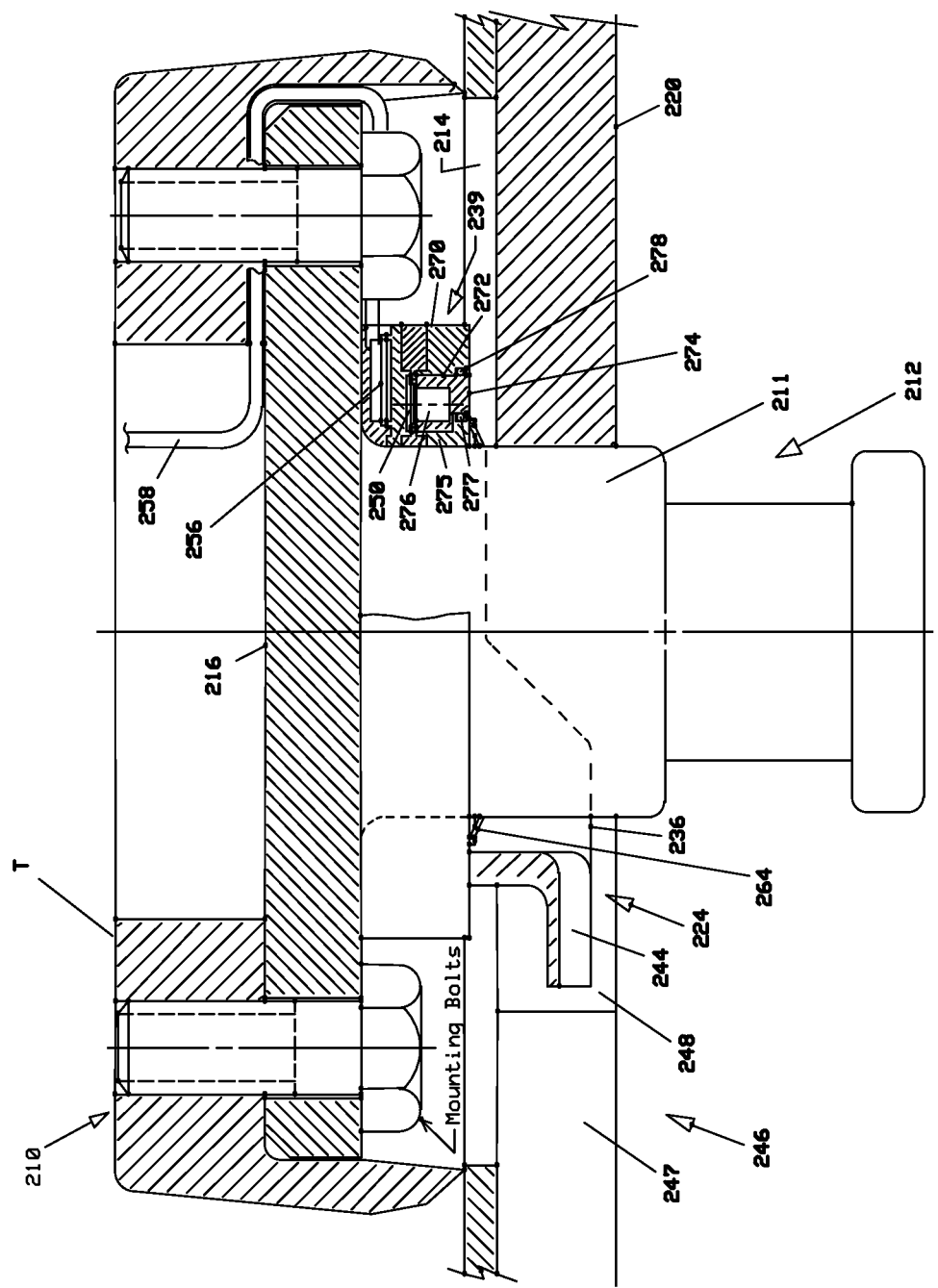
FIG. 7 is a cross sectional view of a third embodiment of this invention.

Turning now to FIG. 7, a third apparatus in accordance with this invention is shown and designated by the numeral 210. As with the second apparatus 110 of FIG. 6, this apparatus 210 employs a transfer assembly 224 including a radially-extending tongue 244 that extends from an annular sleeve 236. As with other embodiments, the tongue 244 is positioned so as to engage the opposed parallel walls 248 of the mounting zone of a fifth wheel 220. In this embodiment, the sleeve 236 includes a stationary sleeve portion 270 that provides an annular channel 272 and holds a sensor element 250. The tongue 244 connects to a magnet support 274 that rotates within the annular channel 272 relative to the stationary sleeve portion 270 and the sensor element 250. The magnet support holds a magnet 276 such that, as the magnet support 274 is rotated about the kingpin 112 by movement of the tongue 244, the magnet 276 moves relative to the sensor element 250. The stationary sleeve portion 270 is secured to the upper portion 211 of the kingpin 212 by a retaining ring 264, and the magnet support 274 is sealed in the annular channel 272 of the stationary sleeve portion 270 by a set of o-rings 277, 278. The stationary sleeve portion 270 is a multi-part assembly and provides appropriate bearing surfaces, as at bearing 275, for facilitating the rotational movement of the magnet support 274. The magnet 276 forms a part of an articulation sensing means 239, particularly an output element thereof. The sensor element 250 forms the other part of the articulation sensing means 239, particularly a reader element thereof, "reading" the relative positioning of the magnet. As the tractor turns to the left, the magnet will influence sensor element 250 such that a signal of increasing magnitude will be transmitted to the system. As the tractor turns to the right, the magnet will influence sensor element 250 such that a signal of decreasing magnitude will be transmitted to a processor as in other embodiments. Of course, this relation could be reversed, with the signal increasing upon a right hand turn and decreasing upon a left hand turn. In particular embodiments, there is a singular relationship between the articulation angle and the signal generated by the reader element, i.e., the signal is unique to a given angle. In this way, no ambiguity exists, and the system would be accurate in determining an articulation angle even upon the loss and re-gaining of power to the system. Here, a micro processor 256 is shown as being mounted to the stationary sleeve portion for receiving the signal, the processor serving to calculate the angle of articulation based on the relationship between the sensor element and the magnet. In embodiments wherein the angle of articulation is employed for the purpose of calculating a counter-steer for the trailer, the processor could also serve to calculate a desired counter-steering angle for a counter-steering system. Notably, the data derived in accordance with this invention relating to an angle of articulation may be employed in any desired manner. In a particular embodiment, the sensor element 250 is a magneto resistive element that is influenced by the magnet 276 to output a signal based upon the positioning of the magnet along its circular length. It would be appreciated that the sensor element 250 could be a Hall Effect sensor or any other sensor type that could provide a variable output under the influence of a circular magnet, which would replace the magnet 276. The output of the Hall Effect or other sensor type would be indicative of the angle of articulation.

Figure 8:
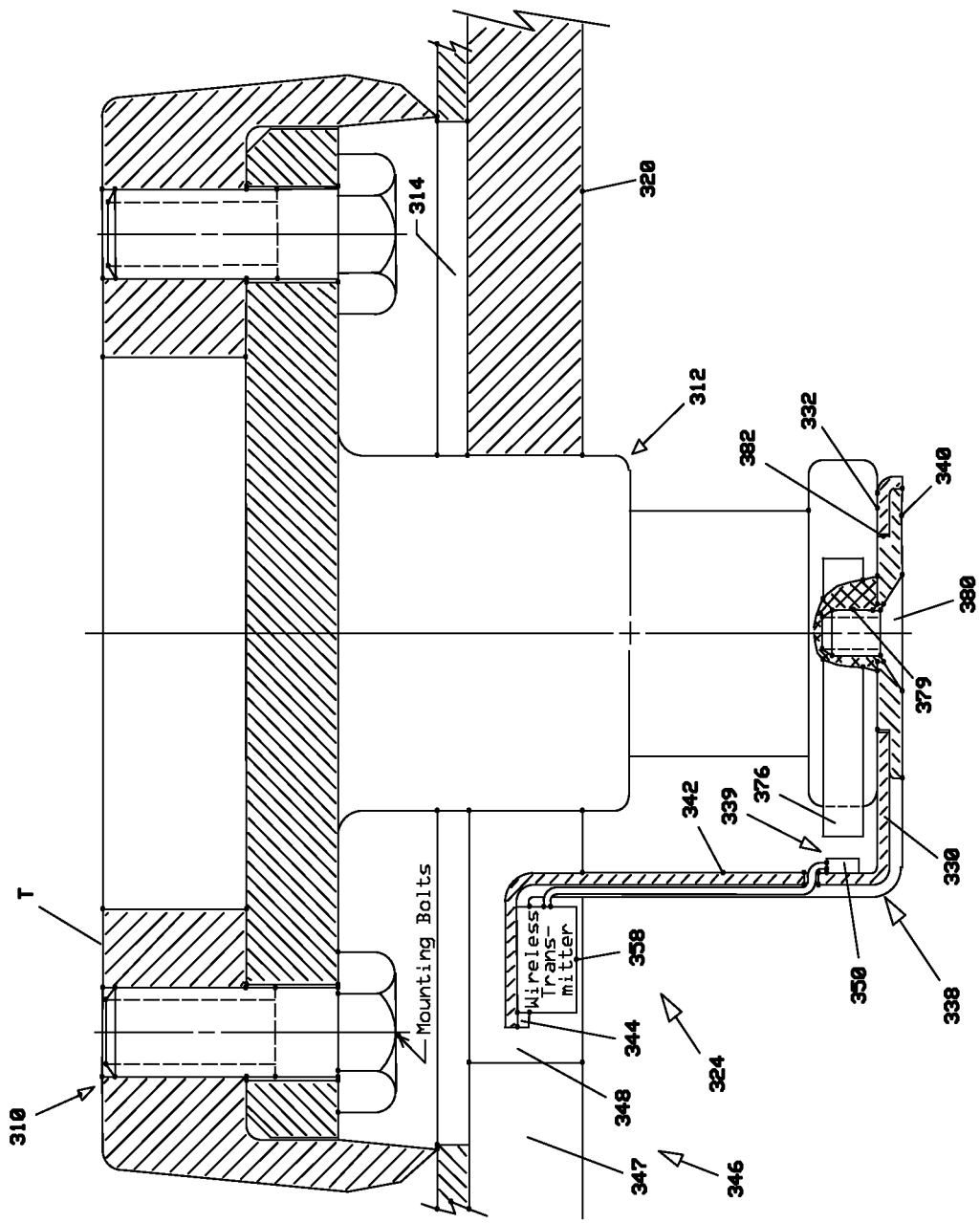
FIG. 8 is a cross sectional view of a fourth embodiment of this invention.

Turning now to FIG. 8, a fourth apparatus in accordance with this invention is shown and designated by the numeral 310. The apparatus 310, like the apparatus 210 of FIG. 7, employs a magnet 376 and sensor element 350 to measure an angle of articulation between the tractor and the trailer. More particularly, the apparatus employs a transfer assembly 324 that includes a tongue 344 extending from a step 342 of a step assembly 338 at such a position that the tongue 344 engages the opposed parallel walls 348 of the mounting zone of a fifth wheel 320 as in other embodiments. The step 342 extends from a base leg 330 that is secured to extend from a connection 340 that is mounted in a blind bore 379 extending into the distal end of the kingpin by a bolt 380 so as to be rotatable about the axis established by the bolt. The base leg 330 is supported axially by connection 340 and rotates around connection 340 at an appropriate radial bearing surface 382 and between connection 340 and the base 332 of the replaceable kingpin 312 for additional axial guidance. The magnet 376 is secured to the outer circumferential surface of the distal end of the kingpin 312, and the sensor element 350 is positioned on the step 342 to be axially aligned therewith. The magnet 376 forms a part of an articulation sensing means 339, particularly an output element thereof. The sensor element 350 forms the other part of the articulation sensing means 339, particularly a reader element thereof, "reading" the relative positioning of the sensor element and the magnet. It will be appreciated that the sensor element 350 moves relative to the magnet 376 as the tongue 344 is acted upon by the opposed parallel walls 348 of the fifth wheel 320. As the tractor turns to the left, the magnet 376 will influence the moving sensor element 350 such that a signal of increasing magnitude will be transmitted to the system. As the tractor turns to the right, the magnet 376 will influence the moving sensor element 350 such that a signal of decreasing magnitude will be transmitted to the system. Thus, a signal will be generated that corresponds to a particular angle of articulation between the tractor and the trailer. This can be transmitted to an appropriate processor or display through a wireless transmitter 358. Of course, the relationship could be reversed, with the signal increasing upon a right hand turn and decreasing upon a left hand turn. In particular embodiments, there is a singular relationship between the articulation angle and the signal generated by the reader element, i.e., the signal is unique to a given angle. In this way, no ambiguity exists, and the system would be accurate in determining an articulation angle even upon the loss and re-gaining of power to the system.

Notably, in all of the embodiments described above, the kingpin is shown as bolted to the underside of a kingpin housing T welded to a trailer at the skid plate. Such embodiments can either be manufactured from scratch or prior art kingpins could be dismounted from the trailer and altered in accordance with this invention to thereafter be re-mounted to the trailer or simply replaced with kingpin assemblies as taught herein. It should be appreciated, however, that not all kingpins are removable from the trailer. Some are welded directly to the skid plate 414 as in FIGS. 9 and 10. It should be appreciated that any embodiment of the present invention could be implemented in a kingpin that is currently welded to a trailer, though some embodiments would require that the apparatus be manufactured before the kingpin is welded into place. However, some embodiments will be capable of being retro-fit onto kingpins that are welded into place, without having to dismount the kingpin. Examples of such apparatus are shown in FIGS. 9 and 10.

Turning now to FIG. 9, another apparatus in accordance with this invention is shown and designated by the numeral 410. The apparatus 410 is identical to the apparatus 310 of FIG. 8 but for the fact that the kingpin 412 is welded to the remainder of the trailer. In FIG. 9, the magnet 476 can be mounted to the bottom portion of the kingpin 412 as an after-market addition. Additionally, the step assembly 438 and its associated sensor element 450 and transmitter 458 can be fitted to a kingpin 412 by drilling and tapping an appropriate hole for rotatably mounting a connection 440 to the kingpin as already disclosed with respect to the apparatus of FIG. 8.

In FIG. 10 an apparatus similarly to that of FIGS. 8 and 9 is shown and designated by the numeral 510. In this embodiment, the sensor element 550 is present at the base leg 530 of the step assembly 538. The sensor element 550 is positioned in close proximity to a semi-circular magnet 576 that is secured to the outer circumference of the connection 540. In this embodiment, the connection 540 remains stationary while the base leg 530 and the remainder of the step assembly 538 rotate relative thereto as the tongue 544 is acted upon, as in other embodiments. The movement of the sensor element 550 along the circumference of the semi-circular magnet 576 generates a signal (wirelessly transmitted at transmitter 558) that relates to a particular angle of articulation between the tractor and trailer. Notably, in any of the embodiments of FIGS. 8, 9 and 10, the Hall Effect sensor and magnet could be replaced by a laser distance sensor and variable radius disc previously described in other embodiments.

Notably, in particular embodiments, all of the apparatus for measuring the articulation angle between a tractor and trailer is mounted to the trailer, and in particular embodiments, is mounted to the kingpin thereof. In some embodiments, even the processor would be mounted to the trailer, though in other embodiments, the processor might be part of the tractor, particularly when wirelessly communicating with the remainder of the apparatus. By associating the reader elements (e.g., laser sensor or Hall Effect sensor) and the output elements (e.g., variable radius/thickness disc or magnet) wholly with the trailer, the trailer is autonomous and not dependent upon any particular equipment of the tractor. Additionally, virtually any of the embodiments disclosed herein could readily be retrofit to existing kingpins and portions of the trailer. The retrofitting being readily apparent from the figures and disclosure herein.

Notably, the tongues (44, 144, etc.) are specifically positioned to engage the opposed parallel walls of the mounting zone of the fifth wheel. Notably, the gap distance between the parallel sides of standard fifth wheels are provided in two standardized dimensions. In one prior art fifth wheel intended for use with kingpins having a diameter of 2.00 inches at the mounting section, the gap between the opposed parallel walls at the mounting zone of the fifth wheel is 2.875 inches, which corresponds to the diameter of such kingpins at their upper, larger diameter section (such as section 111 mentioned herein). In a second prior art fifth wheel intended for use with kingpins having a diameter of 3.50 inches at the mounting section, the gap between the opposed parallel walls of the mounting zone of the fifth wheel is 4.484 inches, which corresponds to the diameter of such kingpins at their upper, larger diameter section. Thus, it is envisioned that apparatus in accordance with the present invention can be manufactured with tongues of two differing widths, and the apparatus of the present invention, in these two variations, could be employed on virtually all standardized fifth wheels. This is significantly different from, for example, the prior art of Bettini U.S. Pat. No. 5,536,030, wherein a C-shaped plate of flexible and spring-like material must be employed to contact the V-shaped opposed angled walls of the mounting zone of the fifth wheel, the C-shaped plate of flexible material being necessary because the dimensions of the V-shaped section vary from manufacturer to manufacturer.

In light of the foregoing, it should be appreciated that the present invention significantly advances the art by providing apparatus for measuring the articulation angle between a tractor and trailer in an articulated vehicle, the apparatus being that which is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art.

The invention claimed is:

1. An apparatus for measuring the articulation angle between a tractor and trailer in an articulated vehicle during turning of the tractor, the tractor including a fifth wheel mounted to the tractor and having a mounting zone defined in part by opposed parallel walls of fixed width there between, the apparatus comprising:
   a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom;
   a transfer assembly mounted to said kingpin and having a tongue positioned between the opposed parallel walls of the mounting zone, said tongue having a width fitting intimately between the fixed width between the opposed parallel walls of the fifth wheel, said transfer assembly being rotationally moved relative to said kingpin by relative rotational movement between said kingpin and the fifth wheel;
   an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

2. The apparatus of claim 1, wherein said kingpin is devoid of a through bore receiving a portion of said transfer assembly.

3. The apparatus of claim 2, wherein said kingpin shaft has a distal end opposite said kingpin mounting plate and said transfer assembly is mounted to said distal end of said kingpin shaft.

4. The apparatus of claim 3, wherein said reader element is mounted to said transfer assembly.

5. The apparatus of claim 1, wherein said output element is mounted to said transfer assembly and said reader element is mounted to said kingpin.

6. The apparatus of claim 5, wherein said reader element is a laser distance sensor directing a laser beam at said output element such that the distance the laser beam travels to contact the output element varies with the articulation angle between the tractor and trailer.

7. The apparatus of claim 6, wherein said output element is a sleeve mounted around said kingpin, said sleeve presenting a sloped surface to said laser beam.

8. The apparatus of claim 7, wherein the apparatus further comprises a seal between said sleeve and said kingpin mounting plate, said sloped surface of said sleeve being presented interiorly of said seal.

9. The apparatus of claim 6, wherein said kingpin shaft includes a through bore at its central axis, said through bore also extending through said kingpin mounting plate, and said transfer assembly includes a rod extending through said through bore to associate said tongue with said output element.

10. The apparatus of claim 5, wherein said output element is a magnet and said reader element is a magneto resistive element that is influenced by said magnet to output a signal based upon the positioning of said magnet along the length of said magneto resistive element.

11. The apparatus of claim 10, further comprising a stationary sleeve portion about said kingpin, said stationary sleeve portion providing an annular channel and holding said magneto resistive element.

12. The apparatus of claim 11, wherein said transfer assembly includes a magnet support mounted so as to rotate in said annular channel, said magnet support holding said magnet and being operatively connected to said tongue.

13. An apparatus for measuring the articulation angle between a tractor and trailer in an articulated vehicle during turning of the tractor, the tractor including a fifth wheel mounted to the tractor and having a mounting zone, the apparatus comprising:
   a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom;
   a transfer assembly mounted around said kingpin and having a tongue positioned in the mounting zone, said transfer assembly being rotationally moved relative to said kingpin by relative rotational movement between said kingpin and the fifth wheel;
   an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

14. The apparatus of claim 13, wherein said reader element is a laser distance sensor directing a laser beam at said output element such that the distance the laser beam travels to contact the output element varies with the articulation angle between the tractor and trailer.

15. The apparatus of claim 14, wherein said output element is a sleeve mounted around said kingpin, said sleeve presenting a sloped surface to said laser beam.

16. The apparatus of claim 15, wherein the apparatus further comprises a seal between said sleeve and said kingpin mounting plate, said sloped surface of said sleeve being presented interiorly of said seal.

17. The apparatus of claim 13, wherein said output element is a magnet and said reader element is a magneto resistive element that is influenced by said magnet to output a signal based upon the positioning of said magnet along the length of said magneto resistive element.

18. The apparatus of claim 17, further comprising a stationary sleeve portion about said kingpin, said stationary sleeve portion providing an annular channel and holding said magneto resistive element.

19. The apparatus of claim 18, wherein said transfer assembly includes a magnet support mounted so as to rotate in said annular channel, said magnet support holding said magnet and being operatively connected to said tongue.

20. An apparatus for measuring the articulation angle between a tractor and trailer in an articulated vehicle during turning of the tractor, the tractor including a fifth wheel mounted to the tractor and having a mounting zone, the apparatus comprising:
   a kingpin mounted to the trailer and being secured in the mounting zone of the fifth wheel, said kingpin and the fifth wheel rotating relative to one another during turning of the tractor, said kingpin having a kingpin mounting plate and a kingpin shaft extending downwardly therefrom to provide a distal end;
   a transfer assembly mounted at said distal end of said kingpin and having a tongue positioned in the mounting zone, said transfer assembly being rotationally moved relative to said kingpin by relative rotational movement between said kingpin and the fifth wheel;
   an articulation sensing means having one of a reader element and output element mounted to said transfer assembly and the other of said reader element and said output element operatively mounted to said trailer such that said reader element and said output element interact to provide a signal corresponding to the articulation angle between the tractor and trailer.

21. The apparatus of claim 20, wherein said transfer assembly is mounted at a blind bore extending into said distal end of said kingpin.

22. The apparatus of claim 21, wherein said reader element is mounted to said transfer assembly.

23. The apparatus of claim 21, wherein said transfer assembly is mounted to said distal end of said kingpin shaft by a connector, and said output element is mounted around at least a portion of said connector.

* * * * *